United States Patent [19]
Moreau

[11] Patent Number: 5,844,792
[45] Date of Patent: Dec. 1, 1998

[54] POWER SUPPLY CIRCUIT WITH A STORAGE CAPACITOR

[75] Inventor: Jean-Michel Moreau, Grenoble, France

[73] Assignee: SGS-Thomson Microelectronics S.A., Saint Genis, France

[21] Appl. No.: 913,533

[22] PCT Filed: Jan. 17, 1997

[86] PCT No.: PCT/FR97/00089

§ 371 Date: Dec. 3, 1997

§ 102(e) Date: Dec. 3, 1997

[87] PCT Pub. No.: WO97/26701

PCT Pub. Date: Jul. 24, 1997

[30] Foreign Application Priority Data

Jan. 19, 1996 [FR] France ................................... 96 00810

[51] Int. Cl.[6] ................................ H02M 5/42; H02J 7/00
[52] U.S. Cl. ............................................. 363/89; 320/166
[58] Field of Search .................................. 363/21, 56, 89; 320/166; 315/241 R; 307/109

[56] References Cited

U.S. PATENT DOCUMENTS

| 5,087,871 | 2/1992 | Losel | 323/299 |
| 5,371,667 | 12/1994 | Nakao et al. | 363/89 |
| 5,532,572 | 7/1996 | Okamura | 320/166 |
| 5,619,115 | 4/1997 | Kajita | 320/166 |
| 5,715,154 | 2/1998 | Rault | 363/89 |

OTHER PUBLICATIONS

Patent Abstract of Japan, vol. 018, No. 570 (E–1623), Oct. 31, 1994 & JP 06 209574 A, Jul. 26, 1994.

*Primary Examiner*—Stuart N. Hecker
*Attorney, Agent, or Firm*—Wolf, Greenfield & Sacks, P.C.

[57] ABSTRACT

The present invention relates to a supply circuit having a storage capacitor, including, across a rectifying bridge, a storage capacitor associated with a charge path and with a discharge path, the charge path including a current limiter on a determined value and controllable according to the voltage across the rectifying bridge and to the voltage across the storage capacitor, whereby the storage capacitor charges with a substantially constant current during each of its charge phases.

11 Claims, 5 Drawing Sheets

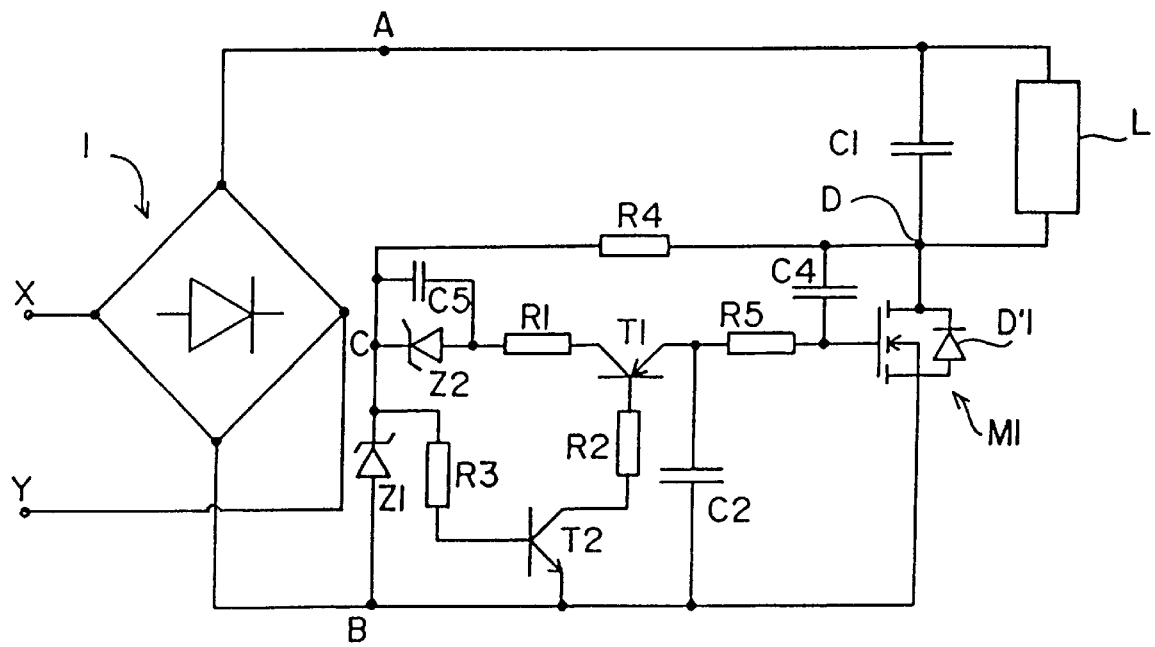
Fig 9
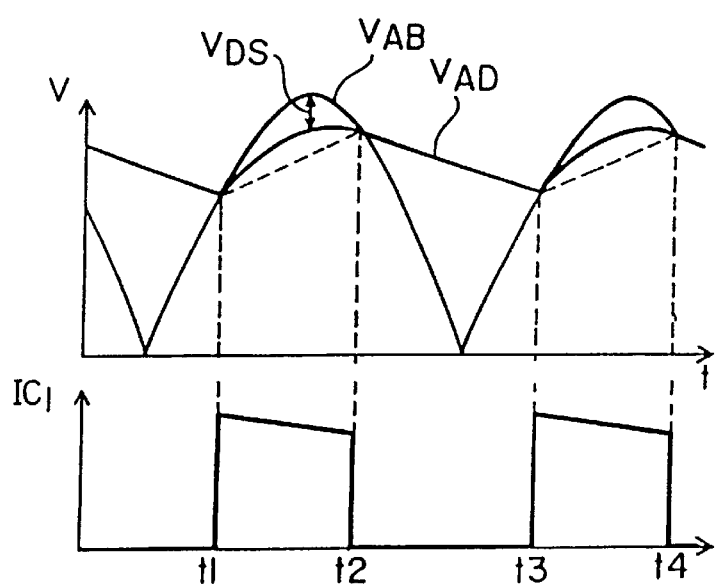
Fig 10A
Fig 10B

POWER SUPPLY CIRCUIT WITH A STORAGE CAPACITOR

The present invention relates to supply circuits of the type having a storage capacitor, for supplying a load via a regulation circuit such as a switched-mode circuit.

At the present time, many devices electrically supplied from the mains include a switched-mode power supply. The power is extracted from the network in the form of short current peaks. These current peaks disturb the network efficiency. The effects resulting from these peaks worsen with the number of devices connected to the network and incorporating a switched-mode power supply. Consequently, electric distribution companies have imposed various standards to improve the power factor of the supplies.

FIG. 1 shows a conventional diagram of the providing of a d.c. power supply from the mains. Terminals X and Y of the a.c. power supply are connected to the input terminals of a rectifying bridge 1, the output terminals A and B of which are connected to a storage capacitor C1 and to a load L. It will be assumed that load L incorporates a regulation circuit, for example, a switched-mode power supply, connected to a load. Further, a resistor of low value r for limiting current surges from the system upon its starting is often to be found in series with capacitor C1.

FIG. 2A shows the rectified mains voltage $V_{xy}$ and voltage $V_{AB}$ between terminals A and B (neglecting the effect of resistor r) as functions of time. It is here assumed that at an initial time t0, the voltage across capacitor C1 is higher than the mains voltage. Then, the voltage between terminals A and B corresponds to the voltage across capacitor C1 which progressively discharges into load L. From time t1 on, the rectified mains voltage becomes higher than the voltage across the capacitor and the mains supplies load L and recharges capacitor C1. From time t2 on, the voltage across the capacitor becomes higher than the mains voltage and the load is supplied again by the capacitor. This is repeated at times t3 and t4.

FIG. 2B shows the shape of the current extracted from the mains between times t1–t2 and t3–t4. Given that a sine generator supplies a load and a capacitor which are linear elements, the current is substantially sinusoidal and, more specifically, it corresponds to a sinusoid peak, that is, its shape is substantially parabolic. A characteristic of the current peaks thus is that they are symmetrical with respect to their maximum and that this maximum can be relatively high.

In prior art, several circuits for improving the power factor to reduce and widen these current peaks have been devised. A simple way of doing so is to limit the value of capacitor C1 so that it discharges relatively strongly during each phase when it supplies the load. Accordingly, time t1 will occur sooner in the period and time interval t1–t2 will be higher. Other circuits for improving the power factor provide that capacitor C1 and possibly other associated capacitors charge less, for example only to half the maximum voltage of the rectified mains. Then, time t2 occurs late in the period. However, in both cases, at least a portion of the current extracted from the mains is shaped as the symmetrical peak illustrated in FIG. 2B.

An object of the present invention is to provide a load supply circuit which limits the amplitude and increases the transition angle of the current peaks extracted from the mains.

Another object of the present invention is to provide such a supply circuit wherein the current peaks extracted from the mains are disymmetrical and preferably exhibit a maximum at the beginning of each peak.

The present invention also aims at providing a supply circuit wherein the charge current of the storage capacitor is controllable independently from the type of load supplied.

The present invention also aims at minimizing the consumption of the supply circuit.

The present invention further aims at providing such a circuit for supplying a load incorporating a regulation circuit of switched-mode power supply type, which minimizes the disturbances brought by the switched-mode power supply to the a.c. voltage supplied to the rectifying bridge.

To achieve these objects, the present invention provides a supply circuit having a storage capacitor, including, across a rectifying bridge, a storage capacitor associated with a charge path and with a discharge path, the charge path including a current limiter on a determined value and controllable according to the voltage across the rectifying bridge and to the voltage across the storage capacitor, whereby the storage capacitor charges with a substantially constant current during each of its charge phases.

According to an embodiment of the present invention, the current limiter is an N-channel MOS enrichment transistor associated with gate biasing means.

According to an embodiment of the present invention, the gate biasing means include means for storing a voltage which is a function of the voltage between the drain and the source of the MOS transistor, the time constant of these storage means being long with respect to the period of the input signals of the rectifying bridge.

According to an embodiment of the present invention, the gate biasing means include the series connection, between the drain and the source of the limiting transistor, of a bidirectional switch controlled to be closed during charge periods, of at least a first resistor and of a second capacitor, the second capacitor forming the storage means.

According to an embodiment of the present invention, the switch is a first bipolar transistor of PNP type.

According to an embodiment of the present invention, the switch control means include a second resistor connected to the base of the first bipolar transistor, a second bipolar transistor of NPN type connected between the second resistor and the source of the limiting transistor, and a third resistor connected between the base of the second bipolar transistor and a potential close to that of the drain of the limiting transistor.

According to an embodiment of the present invention where a load is connected to the output terminals of the rectifying bridge, the second capacitor is connected between the gate and the source of the limiting transistor.

According to an embodiment of the present invention, the first resistor is of high value and is interposed between the gate of the limiting transistor and the collector of the first bipolar transistor, a terminal of the third resistor and the emitter of the first bipolar transistor being connected to the drain of the limiting transistor, whereby the second capacitor stores a voltage substantially corresponding to the mean voltage between the drain and the source of the limiting transistor.

According to an embodiment of the present invention, a first terminal of the first resistor is connected to the collector of the first bipolar transistor, the emitter of the first bipolar transistor being connected to a first terminal of the second capacitor, a second terminal of which is connected to the source of the limiting transistor.

According to an embodiment of the present invention, a load is connected across the storage capacitor, the gate biasing means further including a fifth resistor connected between the emitter of the first bipolar transistor and the gate of the limiting transistor, and a third capacitor connected between the drain and the gate of the limiting transistor, whereby the gate of the limiting transistor is biased by a voltage corresponding to the sum of a first voltage proportional to the voltage between the drain and the gate of the limiting transistor and of a second voltage proportional to the derivative of the voltage between the drain and the source of the limiting transistor.

According to an embodiment of the present invention, the circuit further includes a fourth resistor of low value mounted in series with a zener diode between the drain and the source of the limiting transistor, the midpoint of the series association of the fourth resistor and the zener diode being connected to a second terminal of the first resistor.

These objects, characteristics and advantages as well as others, of the present invention, will be discussed in detail in the following non-limiting description of specific embodiments in relation with the accompanying drawings, among which:

FIG. 9 shows an example of detailed diagram of the second embodiment of the present invention; and FIGS. 10A and 10B show voltage and current curves corresponding to the diagram of FIG. 9.

The same elements have been referred to with the same references in the different drawings. For clarity, only those elements necessary to the understanding of the present invention have been shown in the drawings and the voltage and current curves are not to scale.

FIG. 3 shows a first embodiment of the present invention according to which a load L, for example a switched-mode power supply, is directly connected to the output terminals of a rectifying bridge.

Figure 3:
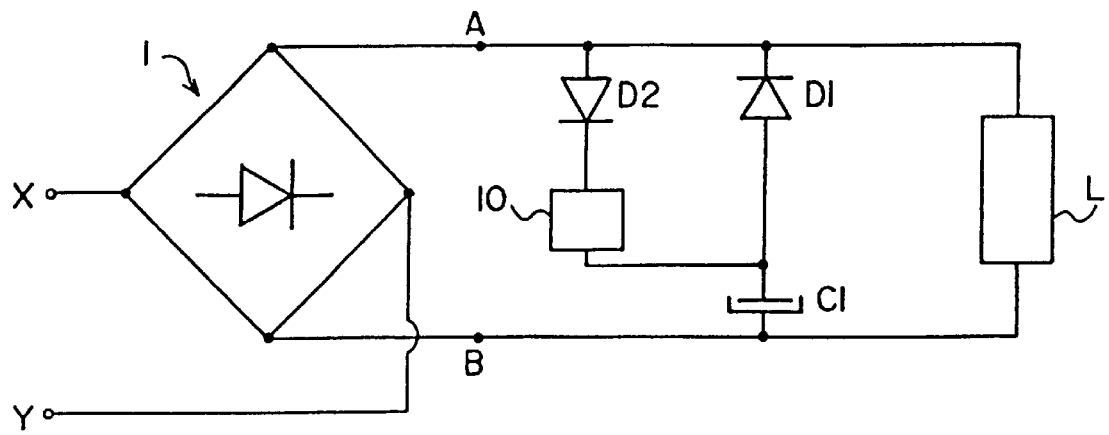
FIG. 3 shows a simplified diagram of a first embodiment of the present invention.

FIG. 3 shows a rectifying bridge 1 provided with input terminals X and Y and rectified output terminals A and B, a storage capacitor C1 and a load L. Capacitor C1 is associated with a discharge path defined by a diode D1 and with a charge path defined by a diode D2. A current limiter 10 is inserted in the charge path.

According to the present invention, current limiter 10 is an active element limiting the current in the charge path of capacitor C1 to a substantially constant, controllable, determined value.

Figure 1:
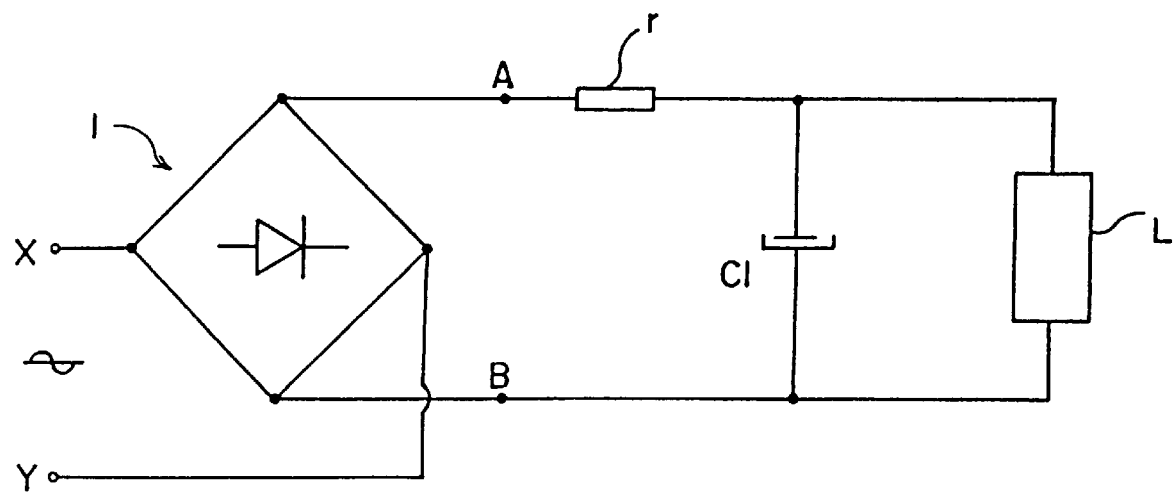
FIG. 1 shows a conventional load rectifying and supply circuit.
Figure 4A:
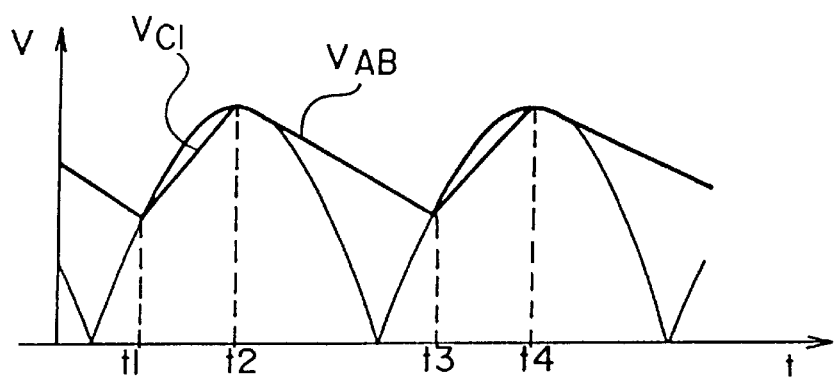
FIGS. 4A to 4D show voltage and current curves corresponding to the diagram of FIG. 3.

Thus, in conditions similar to those of FIG. 1, a substantially identical shape of voltage $V_{AB}$ is obtained. However, as shown in FIG. 4A, capacitor C1 being charged with a constant current due to the presence of current limiter 10, voltage $V_{C1}$ across it varies linearly. The capacitor stops charging to take over on the supply voltage at the time t2 when $V_{AB}$ becomes lower than $V_{C1}$.

Figure 4B:

FIG. 4B shows current $I_{C1}$ in capacitor C1 during charge periods. This current is constant due to the presence of current limiter 10.

Figure 4C:
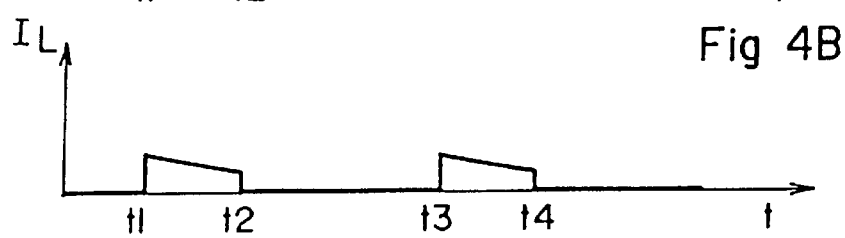

FIG. 4C shows current $I_L$ in the load during periods t1–t2 and t3–t4. This current is supplied by the rectified mains voltage. Given that the case of a regulated power supply has been considered, the power in the load is constant. Since, during periods t1–t2 and t3–t4, voltage $V_{AB}$ increases, the current in the load will decrease. Of course, there also is a current flowing in the load outside periods t1–t2 and t3–t4. This current, supplied by the charge of capacitor C1, has not been shown since it is only desired herein to explain the shape of the current supplied by the mains, which is zero outside periods t1–t2 and t3–t4.

Figure 4D:
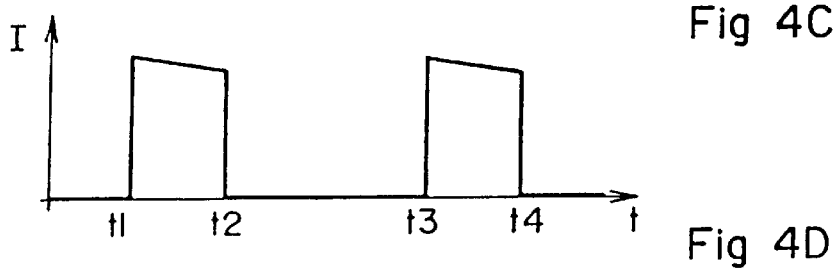

FIG. 4D illustrates the total current extracted from the rectified power supply during periods t1–t2 and t3–t4. This current I is the superposition of currents $I_L$ and $I_{C1}$, that is, each current peak exhibits a maximum at time t1 and decreases until time t2.

Thus, differently from a resistor which would be inserted in the charge path and which, while limiting the charge current of the capacitor, would maintain a symmetrical current peak shaped as a sinusoid arch, the current limiter of the present invention makes the charge current of capacitor C1 substantially constant to make the current peaks I extracted from the rectified power supply all but constant but disymmetrical during the charge periods of capacitor C1.

Figure 2A:
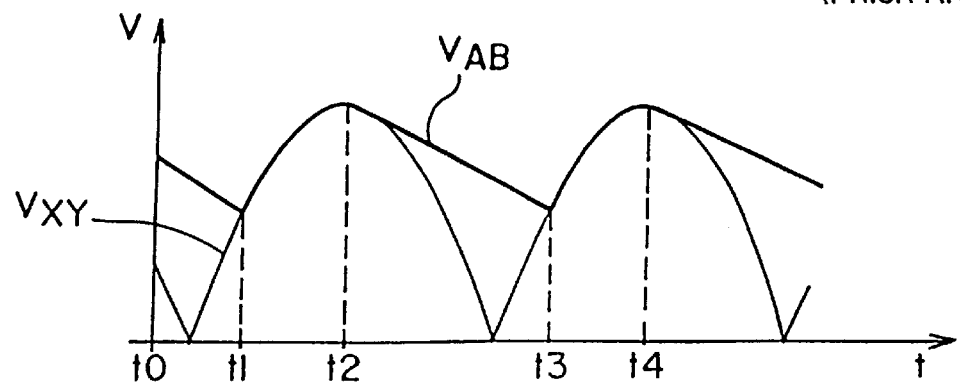
FIG. 2A and 2B show voltage and current curves corresponding to the diagrams of FIG. 1.
Figure 2B:
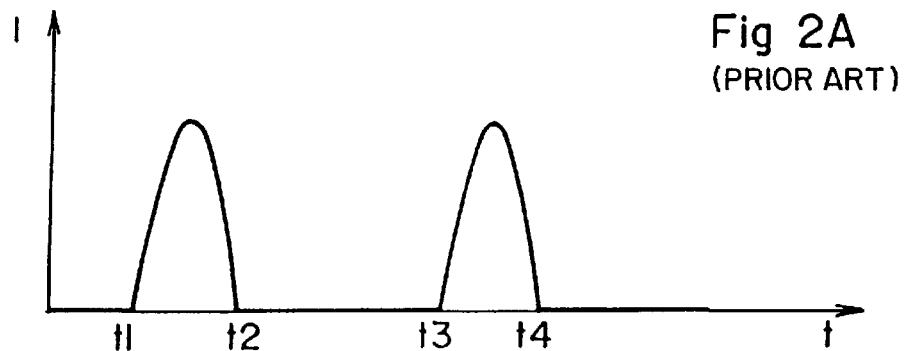

It could be shown that, for a same load, given that the supply is performed with a constant current and not according to a sinusoid or parabola portion, the maximum value of current $I_{C1}$ is substantially two thirds of the maximum value of the peak current in FIG. 2B. This is a first advantage of the present invention, another advantage being, as indicated previously, that the total current I is disymmetrical and has an initial maximum. A third advantage of the present invention is that it is no longer useful to provide a resistor for limiting the surge current upon power-on.

However, the circuit of FIG. 3 has a considerable practical disadvantage which is that, for the preceding explanations, the case where the circuit of FIG. 3 has the same results as that of FIG. 1 has been considered, that is, the current limiter has been assumed to be set to an optimal value. In practice, it is not possible to choose this optimal current which depends on the values of capacitor C1 and load L. The present invention thus provides such a circuit wherein the current limiter automatically adapts to the circuit parameters (values of C1 and L).

A characteristic of the present invention is that the current limiter is controlled according to the signal taken from rectifier 1 and requires no control signal from load L. Thus, the supply circuit is, according to the present invention, independent from the type of load supplied and can be interposed in a conventional circuit between a rectifying bridge and a load, for example a switched-mode power supply, without it being necessary to add modifications to the conventional load to take the control signal therefrom.

Figure 5:
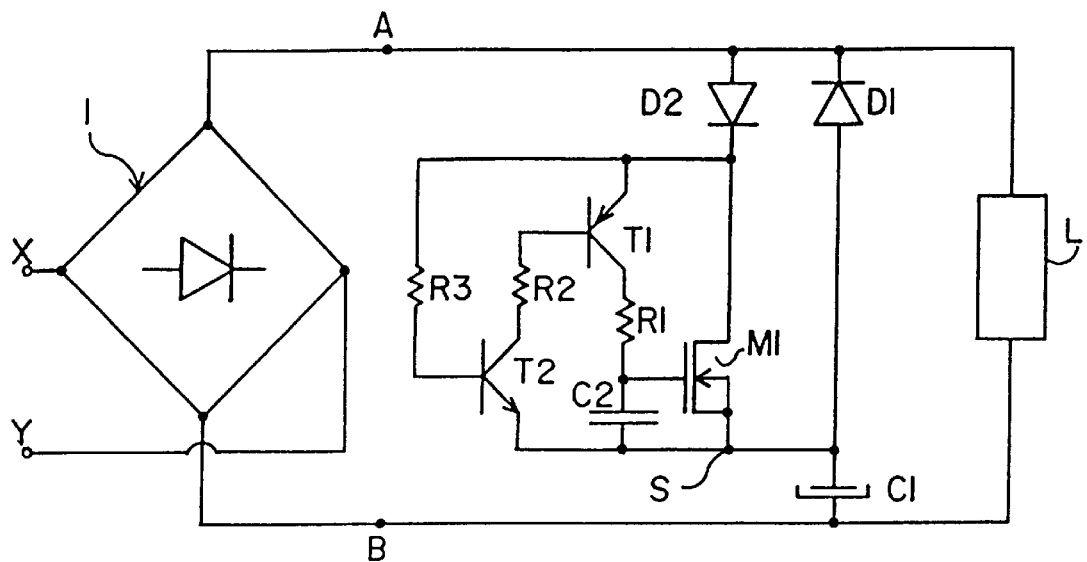
FIG. 5 shows an example of detailed diagram of the first embodiment of the present invention.

FIG. 5 shows a first example of detailed diagram of the first embodiment of the present invention wherein a double half-wave rectifier 1 supplies a load L and is associated with a capacitor C1 via a discharge path determined by a diode D1 and a charge path determined by a diode D2.

In this embodiment, the charge path current limiter is implemented in the form of an N-channel enrichment MOS transistor M1. It is known that such a component operates as a current limiter if its gate-source voltage is set to a constant value, the limiting value increasing with the gate-source voltage. The present invention provides to bias the gate of transistor M1 by means of a charged capacitor C2, with a long time constant, to a voltage which substantially corresponds to the drain-source voltage of transistor M1. For this purpose, the gate of transistor M1 is, in this first example, connected, via a resistor R1 of high value and a switch T i, to the drain of transistor M1. Switch T1, implemented in the embodiment shown by a bipolar transistor of PNP type, is closed during the periods of charge of capacitor C1 and open during the discharge periods.

While a current flows in transistor M1, its drain voltage is equal to mains voltage VAB minus the voltage drop across forward-biased diode D2 and its source voltage is equal to the voltage on capacitor C1, which increases according to a linear ramp, as shown in FIG. 4.

Figure 6:
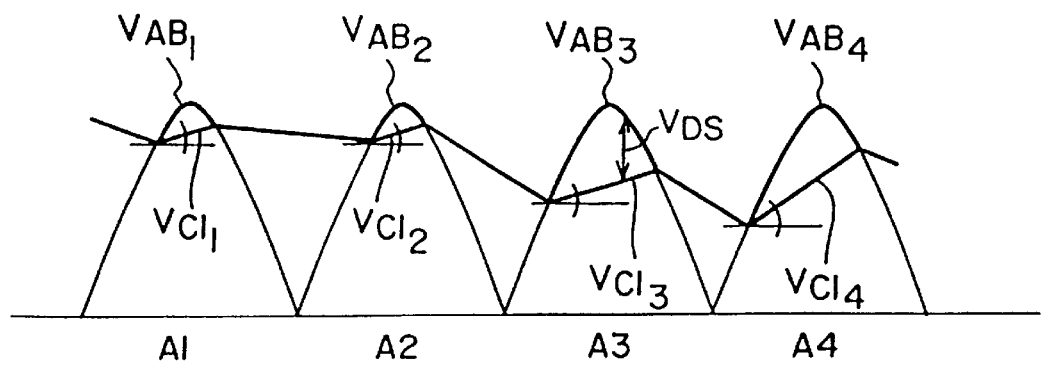
FIG. 6 shows voltage curves corresponding to the diagram of FIG. 5.

FIG. 6 shows several successive halfwaves A1, A2, A3, A4 of the rectified mains voltage and corresponds to FIG. 4A. It is assumed that during the first two halfwaves A1 and A2, the recharging of capacitor C1 perfectly balances the discharge of this capacitor during the periods when it supplies the load, which corresponds to what is shown in FIG. 4. It is then assumed that from halfwave A3, the power required by load L increases. Then, if the recharge slope of capacitor C1, which corresponds to the limited current imposed by transistor M1, is not modified, as it can be seen during halfwave A3, the recharge of capacitor C1 becomes insufficient. However, as indicated previously, the drain-source voltage $V_{DS}$ of transistor M1 is, at any time of a charge period, equal to $V_{AB}-V_{C1}$. This value strongly increases during halfwave A3. Accordingly, the integrated voltage stored in capacitor C2 increases, that is, gate voltage $V_{GS}$ of transistor M1 increases and the value of the limited current imposed by transistor M1 increases. Thus, during halfwave A4, the charge of capacitor C1 is faster than previously and after a few halfwaves a balanced situation is recovered. Of course, while a very fast return to the balanced state has been shown in FIG. 6, it should be clear that in practice the time constant R1C2 will be chosen for the return to the balanced state to be more progressive.

An example of control of PNP transistor T1 to make it (bidirectionally) conductive during the charge periods of capacitor C1 consists of connecting the base of transistor T1 to source terminal S of transistor M1 via the series connection of a resistor R2 and an NPN transistor T2. The base of transistor T2 is connected to the emitter of transistor T1 by a resistor R3. Thus, transistor T2 turns on as soon as the voltage between terminals A and B becomes higher than the voltage across capacitor C1 (plus the voltage drops in forward-biased diode D2 and in the base-emitter junction of transistor T2) and the turning-on of transistor T2 results in the turning-on of transistor T1, whereby capacitor C2 is likely to recharge or discharge to adapt its voltage to the voltage drop across transistor M1.

In a specific embodiment, the following values may be chosen for the various components:

C2=0.1 µF,
R1=200 kohms to 1 Mohms (so that R1.C2>20 ms),
R2=4.7 Mohms, and
R3=100 kohms.

The width of the current peak will be determined conventionally by the relation between the capacitance of capacitor C1 and the power requirement of load L.

Figure 7:
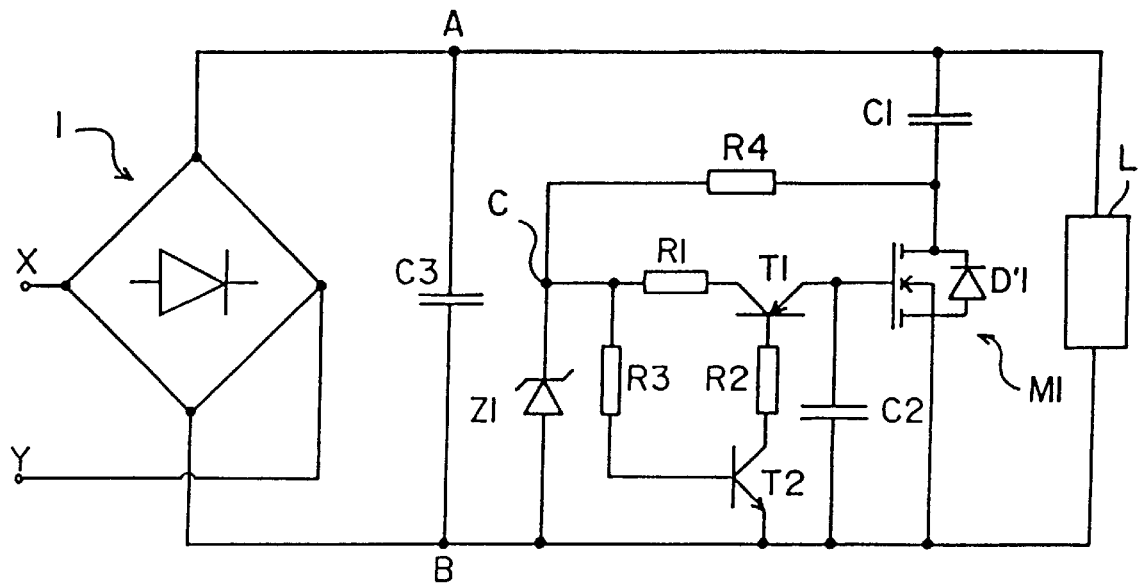
FIG. 7 shows a second example of detailed diagram of the first embodiment of the present invention.

FIG. 7 shows a second example of detailed diagram of the first embodiment of the present invention.

According to this second example, the respective positions of capacitor C1 and of the charge current limiter have been inverted, that is, a first terminal of capacitor C1 is connected to terminal A while a second terminal of capacitor C1 is connected, via transistor M1 mounted in series, to terminal B. Such a modification has no consequence upon the principle described in relation with FIG. 5.

In the example of FIG. 7, the diode (D2, FIGS. 3 and 5) interposed on the charge path has been suppressed. Indeed, the function of this diode may be assumed by the diodes of rectifying bridge 1. An advantage of such a suppression is that the N-channel MOS transistor can then be used both for the charge and the discharge of capacitor C1 and the diode (D1, FIGS. 3 and 5) of the discharge path can be suppressed. Indeed, the function of this diode may be assumed by diode D'1 internal to MOS transistor M1. It will only be provided that this diode D'1 is fast enough in the case where load L is formed of a switched-mode power supply, since the current flowing through the MOS transistor, outside charge periods of capacitor C1 then is at the frequency of the switched-mode power supply.

The automatic control of transistor M1 is always ensured by a charged capacitor C2, with a long time constant, at a voltage which is a function of the drain-source voltage of transistor M1. Here, the gate of transistor M1 is connected, via a bipolar transistor T1 of PNP type and a resistor R1 of high value, to the midpoint C of a series association of a resistor R4 and of a zener diode Z1 between the second terminal of capacitor C1 and terminal B. Transistor T1 always plays the role of a switch which is closed during charge periods of capacitor C1 and open during discharge periods. The control of transistor T1 to make it (bidirectionally) conductive during charge periods of capacitor C1 consists, for example, of connecting the base of this transistor T1 to the source terminal of transistor M1 (terminal B) via the series connection of a resistor R2 and of an NPN transistor T2. The base of transistor T2 is connected to point C by a resistor R3. Thus, transistor T2 becomes conductive as soon as the voltage between terminals A and B becomes higher than the voltage across capacitor C1 (plus the voltage drops in resistors R4 and R3 and in the base-emitter junction of transistor T2) and the turning-on of transistor T2 causes the turning-on of transistor T1, capacitor C2 being then able, like in the first example, to recharge or discharge to adapt its voltage to the voltage drop across transistor M1.

In this example, resistors R1 (+R4) and R2 form a dividing bridge for drain-source voltage $V_{DS}$ of transistor M1. Their sizing depends on the threshold voltage of MOS transistor M1 in the operating current range for which the limiting circuit is meant, in order to obtain across capacitor C2 a ratio of the mean value of voltage $V_{DS}$ adapted to the rapidity (slope $V_{C14}$ in FIG. 6) with which it is desired that capacitor C1 recovers its initial charge level after a variation of the power required by load L.

The role of zener diode Z1 and of resistor R4 is to protect transistor M1 upon power-on of the circuit while capacitor C1 is not yet charged and transistor M1 withstands voltage $V_{AB}$. In the absence of diode Z1, the gate of transistor M1 would rapidly be at a high potential with respect to its source, which would generate a high drain-source current and a risk of breakdown of the gate. Diode Z1 cooperates with resistor R1 and capacitor C2 so that the increase of the gate voltage of transistor M1 is progressive upon power-on and so that is does not reach values prejudicial to transistor M1. Thus, transistor M1 is protected even when the circuit has no surge current limiting resistors at the output of the rectifying bridge. Zener diode Z1 is sized to withstand several hundreds of milliamperes during a few periods of the mains, for the time during which capacitor C1 charges. Resistor R4 preferably has a low value so as not to introduce too high a voltage drop which would delay the turning on of transistor T2. Being of low value, resistor R4 does not introduce any voltage drop between the output of the rectifier and load L.

It should be noted that diode Z1 and resistor R4 are also provided (although not shown) in the example of implementation of FIG. 5.

In FIG. 7, an additional capacitor C3 connected between the output terminals of the rectifier has been shown. Capacitor C3 plays the role of a filter and is necessary (also in the example of FIG. 5), in the case where load L is formed of a switched-mode power supply, to avoid the reinjection of high frequency parasites on the mains during the charge phases of capacitor C1 (while load L receives its energy directly from the mains).

As a specific example of implementation, the following values can be chosen for the various components:

C1=33 µF,
C2=2.2 µF,
C3=1 µF, 400 V,
R1=R2=100 kohms,
R3=47 kohms,
R4=4.7 kohms, and
$V_{Z1}$=24 V.

Figure 8:
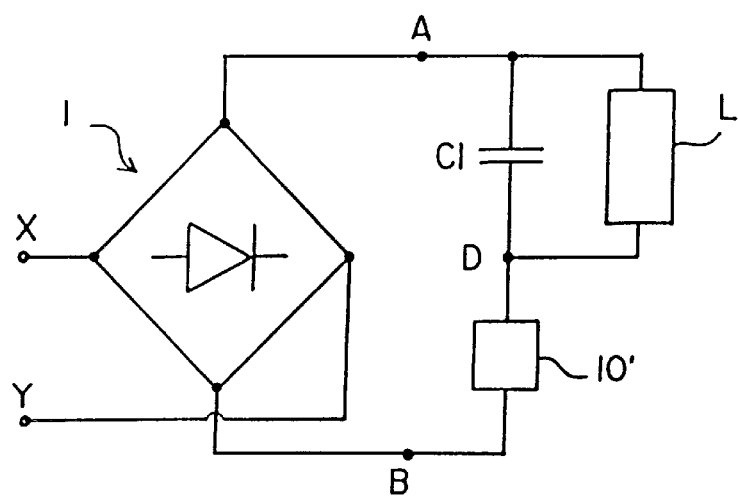
FIG. 8 shows a simplified diagram of a second embodiment of the present invention.

FIG. 8 shows a simplified diagram of a second embodiment of the present invention.

A characteristic of this second embodiment is that load L is no longer connected between output terminals A and B of rectifying bridge 1 but is connected between terminals A and D of capacitor C1, terminal D being connected to terminals B via a current limiting device 10'. This second embodiment of the present invention is more specifically meant for a load L formed of a switched-mode power supply where it has the advantage of avoiding the use of a filtering capacitor (C3, FIG. 7) at the output of the rectifying bridge. Indeed, the filtering of high frequency parasites associated with the switched-mode power supply here is directly ensured by storage capacitor C1.

FIG. 9 shows an example of detailed diagram of a supply circuit according to this second embodiment.

Current limiter 10' is, like in the first embodiment, formed of an N-channel enrichment MOS transistor M1 and, like in the example of FIG. 7, internal diode D'1 of this transistor M1 is used to form the discharge path of capacitor C1.

The control of transistor M1 is performed by means of an assembly resuming most of the circuit shown in FIG. 7. Only the differences with respect to this assembly of FIG. 7 will be discussed hereafter.

According to the second embodiment, a resistor R5 is interposed between the emitter of transistor T1 acting as a switch and the gate of transistor M1, and a capacitor C4 connects the gate and the drain D of transistor M1. The function of cell R5–C4 is to cause a biasing of the gate of transistor M1, no longer only of the mean value of its drain-source voltage, but adding the derivative of this drain-source voltage.

FIG. 10A shows, as a function of time, the rectified mains voltage $V_{AB}$ and voltage $V_{AD}$ across storage capacitor C1. FIG. 10B shows current $I_{C1}$ in capacitor C1 during charge periods.

While being substantially constant, current $I_{C1}$ exhibits a slight decrease between times t1 and t2 and between times t3 and t4 when voltage $V_{AB}$ is higher than the voltage across the capacitor. This decrease is due to the derivative of the drain-source voltage of transistor M1 brought by cell R5–C4.

An advantage of this embodiment is that, as shown in FIG. 10A, voltage $V_{AD}$ is closer to voltage $V_{AB}$ during charge periods than in the first embodiment. Thus, the consumption of the supply circuit is minimized since the power dissipation in transistor M1 is proportional to its drain-source voltage drop $V_{DS}$.

It should be noted that the total current (not shown) extracted from the rectified power supply during periods t1–t2 and t3–t4 always is disymmetrical and always has an initial maximum.

In practice, a zener diode Z2 will preferably be provided between resistor R1 and the anode of zener diode Z1 (point C) to which resistor R3 is connected, a capacitor C5 being associated in parallel to this zener diode Z2. Resistors R1 and R2 can then, if necessary, be sized so that the ratio of the dividing bridge that they form is substantially equal to 1. Indeed, diode Z2 adds a voltage to that of the gate of transistor M1 so that the gate voltage of transistor M1 is substantially constant and mean voltage $V_{DS}$ during the conduction is higher than this gate voltage and substantially equal to voltage $V_{GS}$. The function of capacitor C5 is to maintain the voltage since diode Z2 is not always run through by a current.

Of course, the present invention is likely to have various alterations, modifications and improvements which will readily occur to those skilled in the art, especially as concerns the implementation of the current limiter, the implementation of a control circuit having the function of adjusting the voltage drop across this current limiter to an optimal value, and the implementation of a circuit for enabling the control circuit only during the charge phases of capacitor C1.

Further, those skilled in the art, when desiring to obtain a disymmetrical current peak in correction systems of known power factor, can in many cases combine the present invention with such known systems.

I claim:

1. A supply circuit having a storage capacitor, including, across a rectifying bridge (1), a storage capacitor (C1) associated with a charge path and with a discharge path, characterized in that the charge path includes a current limiter (10, 10') on a determined value and controllable according to the voltage across the rectifying bridge and to the voltage across the storage capacitor, whereby the storage capacitor (C1) charges with a substantially constant current during each of its charge phases.

2. A circuit according to claim 1, characterized in that the current limiter is an N-channel MOS enrichment transistor (M1) associated with gate biasing means.

3. A circuit according to claim 2, characterized in that the gate biasing means include means (C2) for storing a voltage which is a function of the voltage between the drain and the source of the MOS transistor (M1), the time constant of these storage means being long with respect to the period of the input signals of the rectifying bridge.

4. A circuit according to claim 3, characterized in that the gate biasing means include the series connection, between the drain and the source of the limiting transistor (M1), of a bidirectional switch (T1) controlled to be closed during charge periods, of at least a first resistor (R1) and of a second capacitor (C2), the second capacitor forming the storage means.

5. A circuit according to claim 4, characterized in that the switch (T1) is a first bipolar transistor of PNP type.

6. A circuit according to claim 5, characterized in that the switch control means include a second resistor (R2) connected to the base of the first bipolar transistor (T1), a second bipolar transistor (T2) of NPN type connected between the second resistor and the source of the limiting transistor (M1), and a third resistor (R3) connected between the base of the second bipolar transistor (T2) and a potential close to that of the drain of the limiting transistor (M1).

7. A circuit according to claim 6, in which a load (L) is connected to the output terminals (A, B) of the rectifying bridge (1), characterized in that the second capacitor (C2) is connected between the gate and the source of the limiting transistor (M1).

8. A circuit according to claim 7, characterized in that the first resistor (R1) is of high value and is interposed between the gate of the limiting transistor (M1) and the collector of the first bipolar transistor (T1), a terminal of the third resistor (R3) and the emitter of the first bipolar transistor being connected to the drain of the limiting transistor, whereby the second capacitor (C2) stores a voltage substantially corresponding to the mean voltage between the drain and the source of the limiting transistor.

9. A circuit according to claim 6, characterized in that a first terminal of the first resistor (R1) is connected to the collector of the first bipolar transistor (T1), the emitter of the first bipolar transistor being connected to a first terminal of the second capacitor (C2), a second terminal of which is connected to the source of the limiting transistor (M1).

10. A circuit according to claim 9, characterized in that a load (L) is connected across the storage capacitor (C1), the gate biasing means further including a fifth resistor (R5) connected between the emitter of the first bipolar transistor (T1) and the gate of the limiting transistor (M1), and a third capacitor (C4) connected between the drain and the gate of the limiting transistor, whereby the gate of the limiting transistor is biased by a voltage corresponding to the sum of a first voltage proportional to the voltage between the drain and the gate of the limiting transistor and of a second voltage proportional to the derivative of the voltage between the drain and the source of the limiting transistor.

11. A circuit according to claim 9, characterized in that it further includes a fourth resistor (R4) of low value mounted in series with a zener diode (Z1) between the drain and the source of the limiting transistor (M1), the midpoint of the series association of the fourth resistor with the zener diode being connected to a second terminal of the first resistor (R1).

* * * * *